United States Patent [19]

Causer et al.

[11] Patent Number: 4,501,522
[45] Date of Patent: Feb. 26, 1985

[54] MANIPULATOR

[75] Inventors: Roy Causer, Wantage; Donald Orr, Didcot, both of England

[73] Assignee: United Kingdom Atomic Energy Authority, London, England

[21] Appl. No.: 432,759

[22] Filed: Oct. 4, 1982

[30] Foreign Application Priority Data

Oct. 26, 1981 [GB] United Kingdom ................. 8132260

[51] Int. Cl.³ .............................................. B25J 3/04
[52] U.S. Cl. ..................................... 414/4; 414/718; 414/735; 901/18; 901/25
[58] Field of Search ........................................ 414/1-8, 414/730, 718, 719, 732, 735; 901/18, 25

[56] References Cited

U.S. PATENT DOCUMENTS

Re. 28,089  7/1974  Devol .................................. 414/730
3,160,290  12/1964  Wilson ................................ 414/4 X

FOREIGN PATENT DOCUMENTS 1475018   3/1967  France .
 418762   2/1967  Switzerland .
2022046  12/1979  United Kingdom .

Primary Examiner—Robert J. Spar
Assistant Examiner—Terrance L. Siemens
Attorney, Agent, or Firm—William R. Hinds

[57] ABSTRACT

A manipulator for remote handling in a hostile environment 14, has a slave arm 10 comprising an upper arm 30, a forearm 52 and a jaw mechanism 60. The upper arm 30 is pivotally suspended from a shoulder support 20 and is telescopically extendible such that straight line motion of the forearm 52 is readily obtained. In addition the forearm 52 is arranged to pivot relative to the upper arm 30 through the same angle as the upper arm 30 but in the opposite sense such that the forearm 52 maintains a constant orientation when the upper arm 30 pivots. All the motions of the slave arm 10 may be controlled through mechanical linkages from a drive unit 18 situated outside the hostile environment 14, and extending through shielding 13 into the environment 14.

17 Claims, 17 Drawing Figures

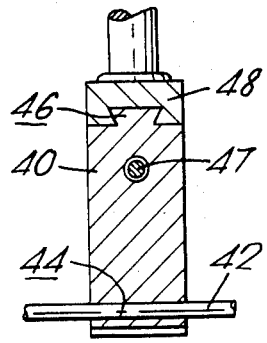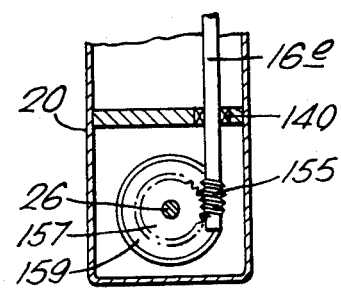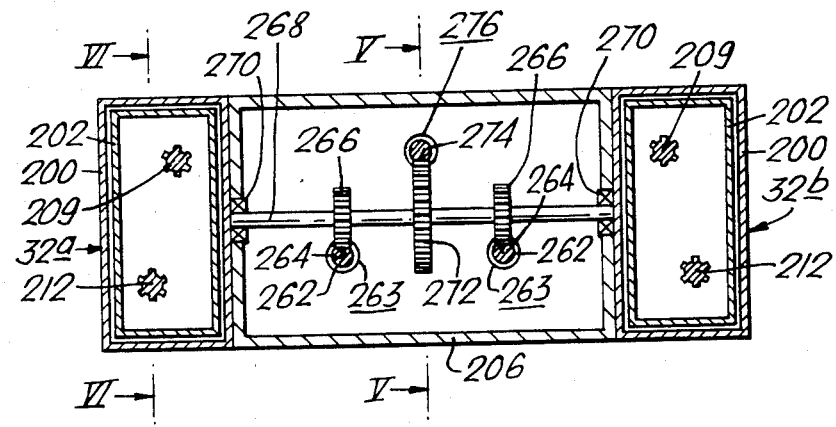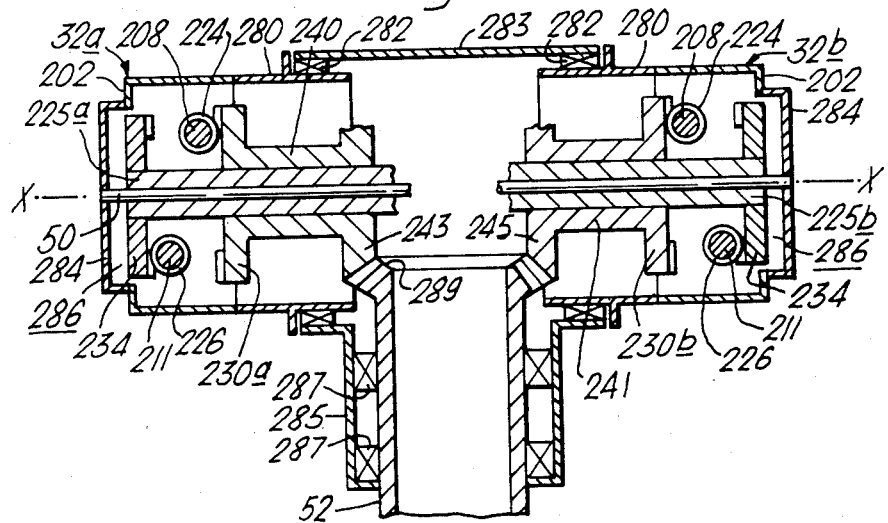

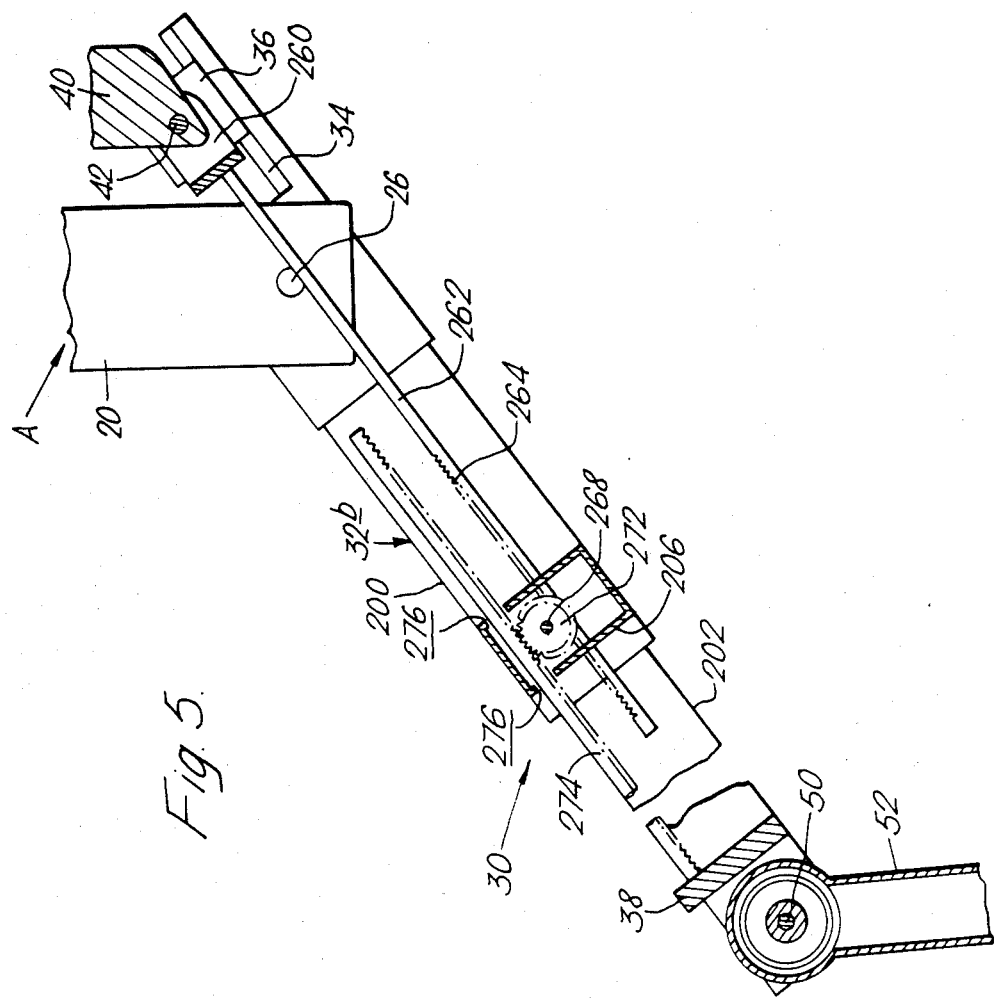

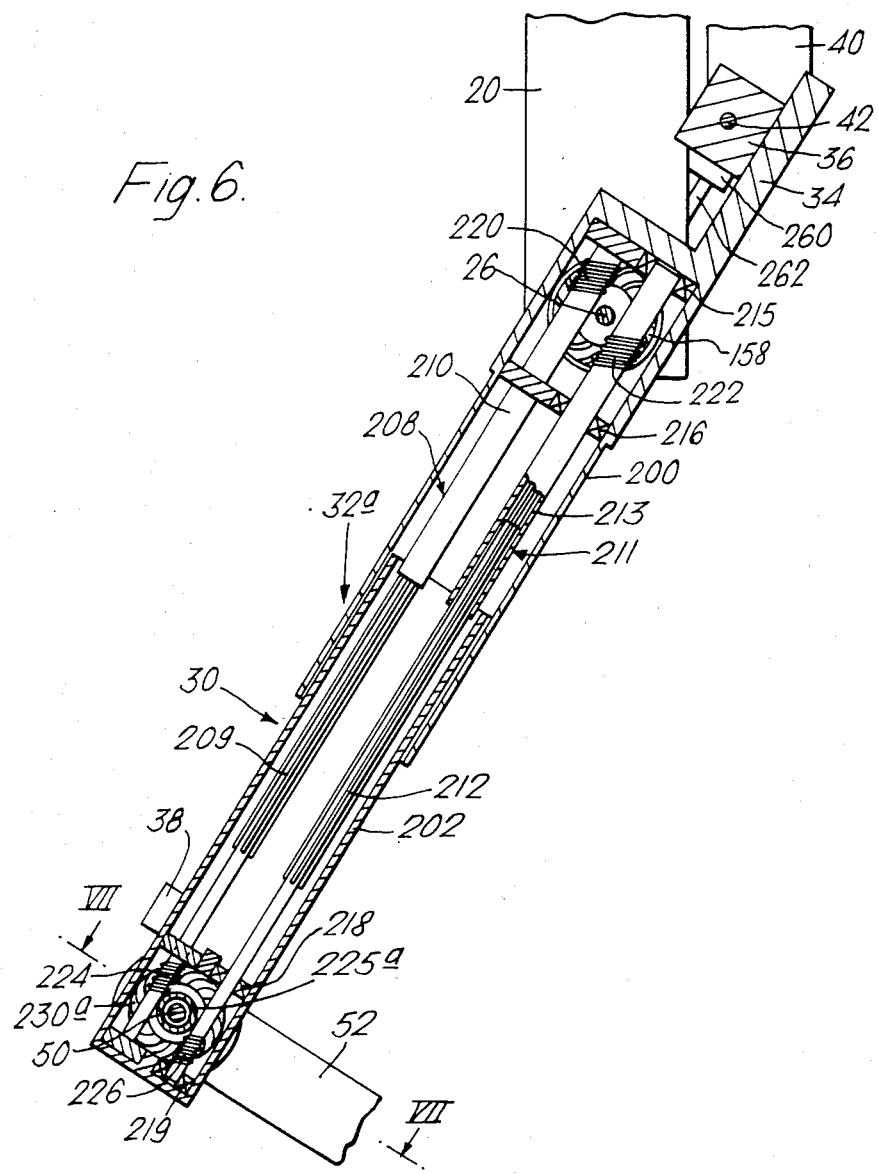

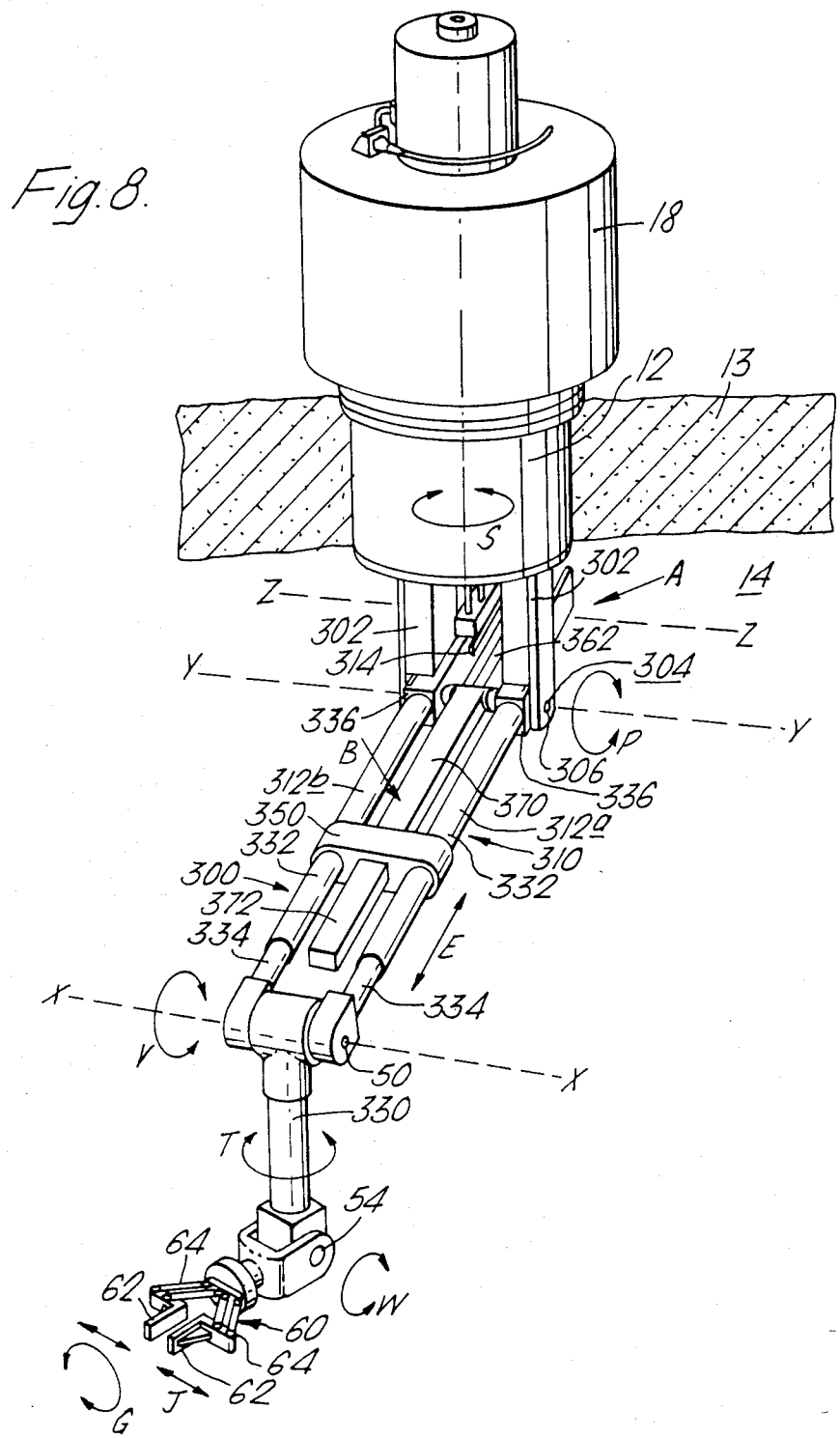

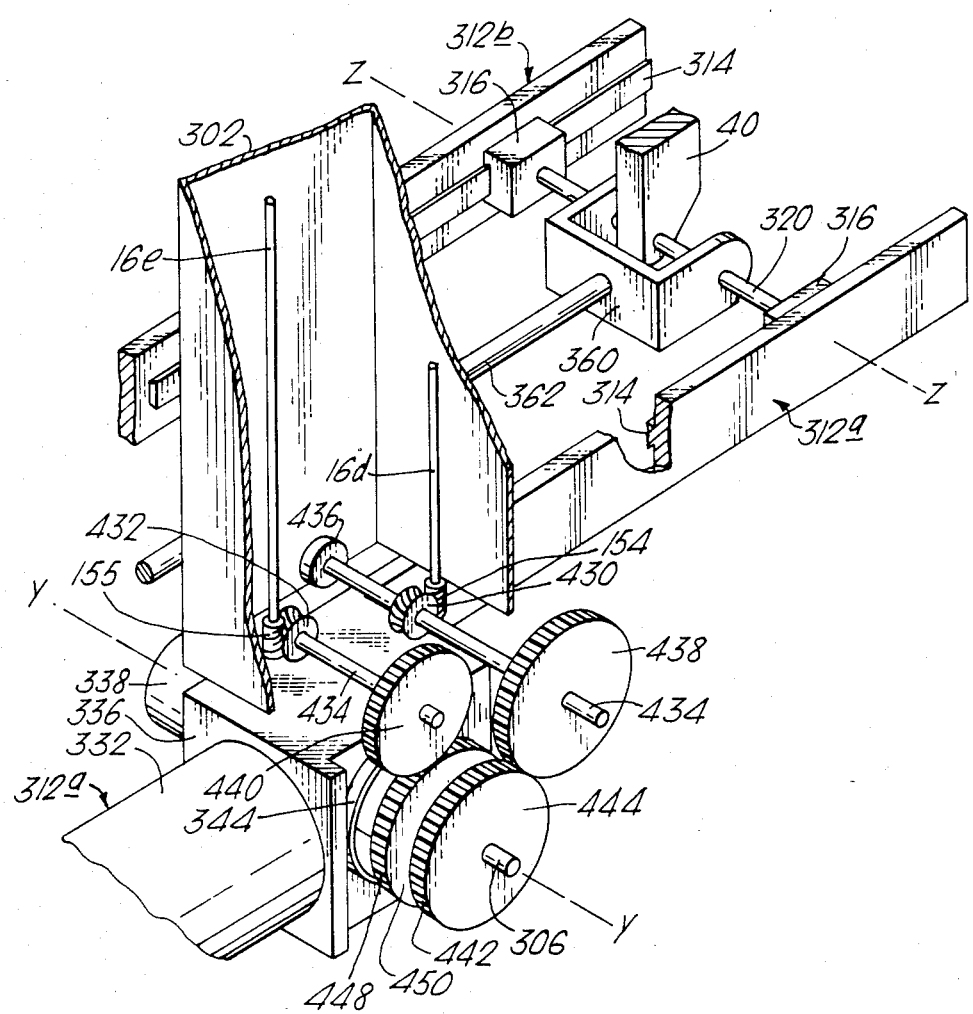

MANIPULATOR

This invention relates to manipulators used for handling objects remotely, for example in a hostile environment.

Such manipulators typically include a variable length slave arm suspended at one end and which is usually capable of providing three distinct angular movements. A jaw mechanism is conventionally mounted at a wrist portion at the other end of the slave arm, and one of the problems associated with such manipulators is that of managing to keep the jaw mechanism at the same attitude with respect to the ground and performing straightline movement with angular movement of the slave arm.

According to the present invention, there is provided a manipulator including a slave arm comprising, a support means defining a first pivotal connection; an upper arm portion of the slave arm arranged to be supported by the first pivotal connection at an intermediate position along the length of the upper arm portion and defining a second pivotal connection at one end of the upper arm portion and a movable connection at or near the other end of the upper arm portion, the axes of the first and of the second pivotal connections being substantially parallel; a forearm portion of the slave arm connected at one end to the second pivotal connection; pivoting means connected to the movable connection for pivoting the upper arm portion about the first pivotal connection, and drive means for moving the pivoting means; the distances of the second pivotal connection and of the movable connection from the first pivotal connection being variable but such that the ratio of the distances between the first and the second pivotal connections, and between the first pivotal connection and the movable connection, is maintained substantially constant, and the slave arm being arranged so that pivotal movement of the upper arm portion about the first pivotal connection produces pivotal movement of the forearm portion about the second pivotal connection through the same angle as the pivotal movement of the upper arm portion but in the reverse direction.

The movable connection and the second pivotal connection may be arranged to slide along the upper arm portion which is desirably of telescopic construction, sliding of the movable connection causing telescopic movement of the upper arm portion. The pivoting means may be movable in two mutually perpendicular directions in a plane perpendicular to the pivotal axes of the first and the second pivotal connections. Desirably, all movements of the slave arm are driven from a drive assembly and a plurality of drives to these movements arranged to be energised by the drive assembly from a single motor through gear trains which include pairs of magnetic particle clutches in parallel to engage or disengage a required movement in a selected direction.

In the preferred form of the invention, the drive assembly is arranged to be mounted outside a hostile environment in which the slave arm is to be used, and sealed members extend through an enclosure about the hostile environment from the drive assembly.

The invention will now be further described by way of example only and with reference to the accompanying drawings, in which:

FIG. 2a shows a sectional view on the line IIa—IIa of FIG. 2;

FIG. 3a shows a sectional view on the line IIIa—IIIa of FIG. 3;

FIG. 4 shows a sectional view on the line IV—IV of FIG. 1;

FIG. 5 shows a sectional view on the line V—V of FIG. 4;

FIG. 6 shows a modified sectional view on the line VI—VI of FIG. 4;

FIG. 7 shows a sectional view on the line VII—VII of FIG. 6;

FIG. 8 shows a perspective view of an alternative manipulator slave arm;

FIG. 8a shows a perspective view, partly broken away and to an enlarged scale, in the direction of arrow A of FIG. 8;

Figure 1:
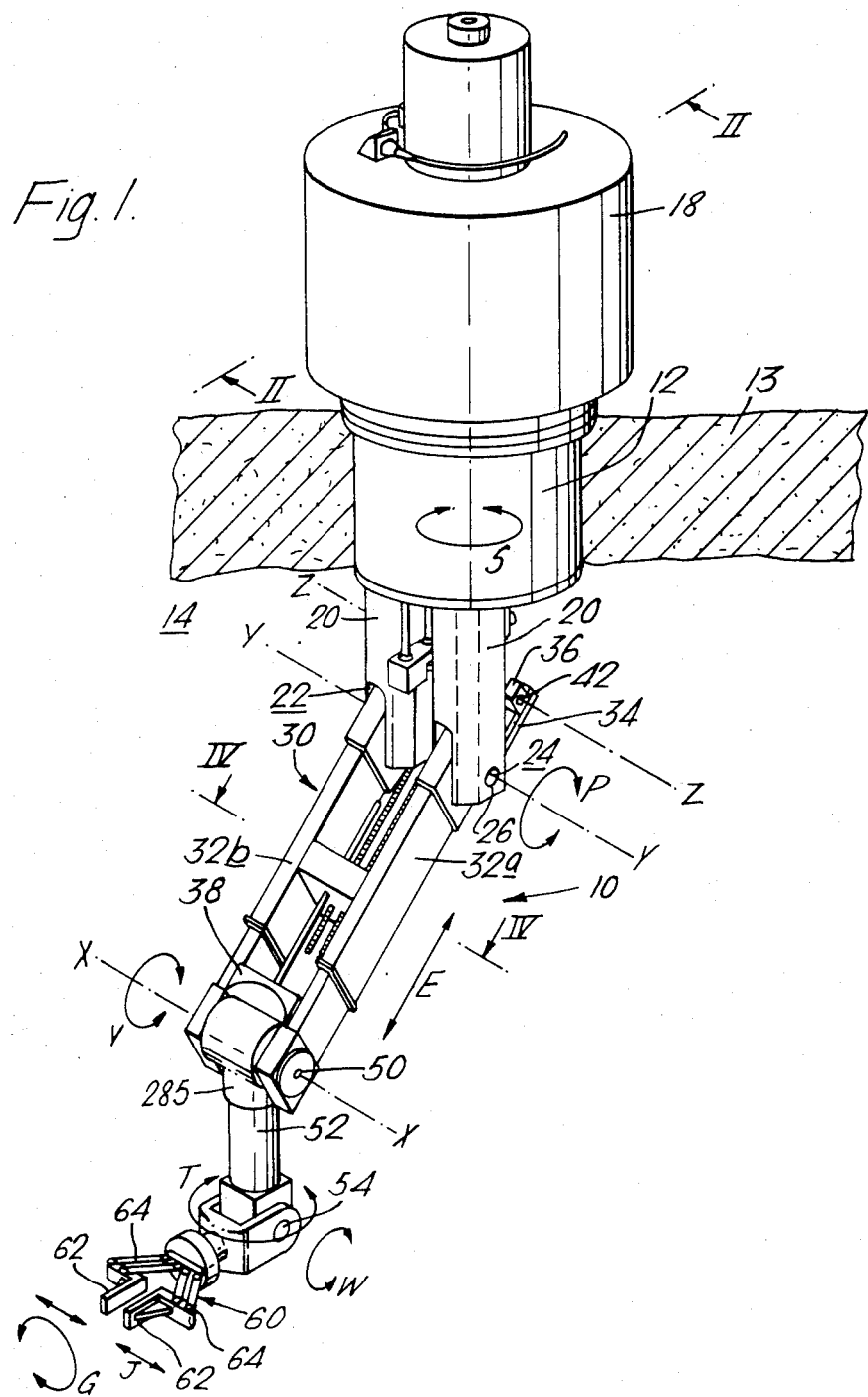
FIG. 1 shows a perspective view of a manipulator slave arm.

Referring now to FIG. 1, a manipulator slave arm 10 is shown secured to a sealed cylindrical plug 12 in a roof 13 of a radioactive cell 14. Sealed drives (not shown) to the slave arm 10 are provided through the plug 12 from a demountable drive assembly 18. Two support beams 20 extend down from the base of the plug 12, having upwardly extending central slots 22 at the lower end of each support beam 20 and holes 24 through each support beam 20 along an axis Y—Y to locate shoulder pivot pins 26. The slave arm 10 has an upper arm 30 comprising two parallel telescopic members 32a, 32b respectively supported by the support beams 20 and which are pivotable in pitch 'P' about the axis Y—Y.

Figure 5A:
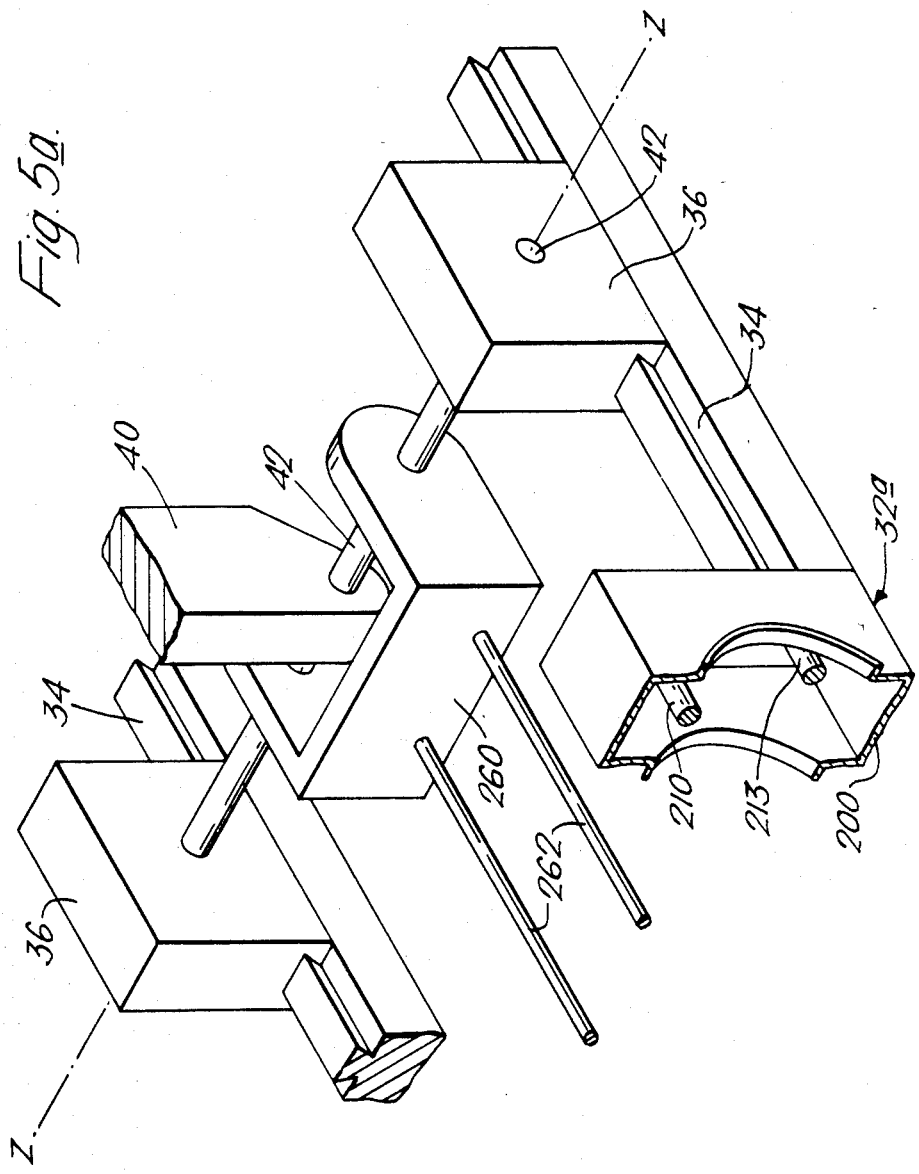
FIG. 5a shows a perspective view in the direction of arrow A of FIG. 5.

As shown in more detail in FIG. 5a to which reference is made, the upper ends of the telescopic members 32a, 32b, define slides 34 which support respective sliding blocks 36 between which a control pivot pin 42 extends along an axis Z—Z parallel to the axis Y—Y and locates in a control member 40 capable of vertical and horizontal displacement. The lower ends of the telescopic members 32a, 32b are joined by a lower bridging member 38 and by an elbow pivot pin 50 on an axis X—X parallel to the axis Y—Y. The extension of the telescopic members 32a, 32b is arranged such that the distance from the axis Y—Y to the axis X—X bears a constant ratio to the distance from the axis Y—Y to the axis Z—Z, and such that the axes X—X, Y—Y, Z—Z remain co-planar. Hence motion of the control member 40 generally produces simultaneous pitching P and extension E of the upper arm 30.

The elbow pivot pin 50 supports a forearm 52 which is pivotable about the axis X—X as shown by arrow V of FIG. 1. At the lower end of the forearm 52 is a wrist pivot pin 54 extending perpendicular to the longitudinal axis of the forearm 52, which supports a jaw mechanism 60. The jaw mechanism 60 can turn G about its longitudinal axis; it can turn T about the longitudinal axis of the forearm 52; and can pivot W about the axis of the wrist pivot pin 54, and comprises a pair of jaws 62 supported by a parallel motion linkage 64 to provide prehensile motion 'J' of the jaws 62.

The motions of the component parts of the slave arm 10 can be summarised as follows:
  (i) the slave arm 10 can slew S about the longitudinal axis of the plug 12;
  (ii) the upper arm 30 can pitch P about the axis Y—Y, and is extendible E;
  (iii) the forearm 52 can pivot V about the axis X—X;
  (iv) the jaw mechanism 60 can turn G about its longitudinal axis, can pivot W about the axis of the wrist pivot pin 54, and can turn T about the longitudinal axis of the forearm 52; and
  (v) the jaws 62 can move J in a prehensile manner.

Figure 2:
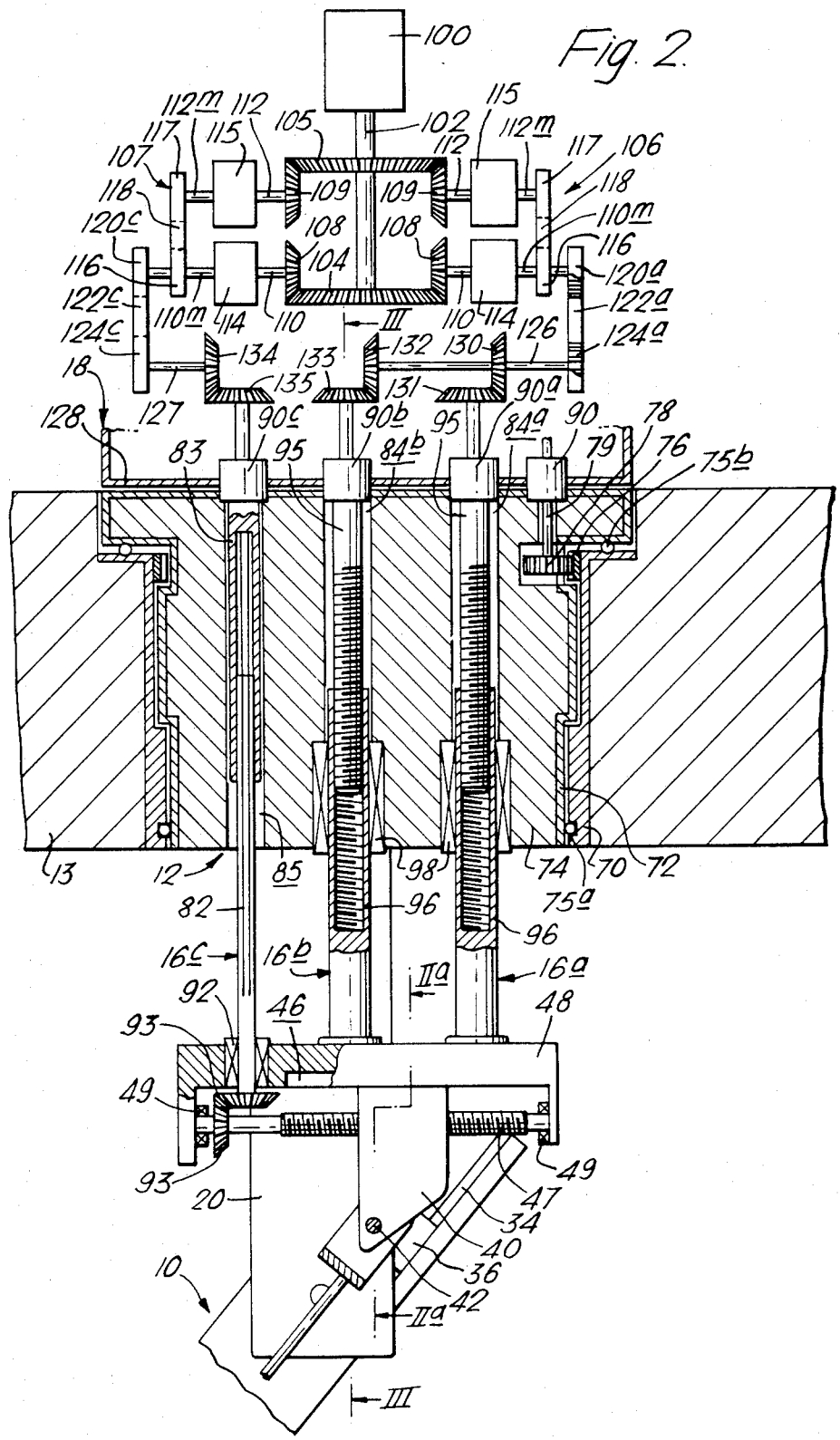
FIG. 2 shows a sectional view on the line II—II of FIG. 1.

Referring now to FIG. 2, the plug 12 comprises an outer cylindrical sleeve 70, and an inner casing 72 filled with a shielding material 74 which may comprise polyethylene or lead depending on the nature of the radiation from within the cell 14. The inner casing 72 is rotatably located in the outer sleeve 70 by ball bearings 75a, 75b, and near the top of the outer sleeve 70 is an internal gear 76 which extends around the inner circumference of the outer sleeve 70 and engages a gear pinion 78 rotatably mounted on the inner casing 72. Rotation of the pinion 78 by means of a shaft 79 and drive means (not shown) through a demountable coupling 90, rotates the inner casing 72 relative to the outer sleeve 70, thus providing slew motion of the slave arm 10.

As shown in more detail in FIG. 2a, the control member 40, which locates the control pivot pin 42 in a cylindrical hole 44, is slidably supported in a slideway 46 on the underside of a support bar 48, and can be driven horizontally by a lead screw 47 which engages the control member 40 and is supported at each end by bearings 49 attached to the support bar 48.

Drives for horizontal and vertical motion of the control member 40 are by means of drive shafts 16a, 16b, 16c passing through channels 84a, 84b, 85 in the shielding material 74 and driven at their upper ends by the drive assembly 18 through demountable couplings 90a, 90b, 90c respectively which incorporate rotary seals (not shown). The drive shaft 16c for horizontal motion of the control member 40 comprises a splined shaft 82 and a corresponding internally splined hollow shaft 83, passing at its lower end through a bearing 92 in the support bar 48, and drivably connected to the lead screw 47 by bevel gears 93. The two drive shafts 16a and 16b for vertical motion of the control member 40 are identical, and each comprises a threaded shaft 95 engaging in an internally threaded hollow column 96 guided in its vertical motion by a recirculating ball bushing 98 and secured at its lower end to the support bar 48.

The drive assembly 18 is mounted on a plate 128 and comprises an electric motor 100 connected to a shaft 102 on which a forward bevel gear 104 and a reverse bevel gear 105 are mounted, each motion of the slave arm 10 being driven by the motor 100 through a corresponding clutch system 106, 107 (only those for vertical and horizontal motions of the control member 40 are shown). The clutch systems 106, 107 are identical and each comprises two bevel gears 108, 109 on parallel shafts 110, 112 and engaging respectively with the forward bevel gear 104 and the reverse bevel gear 105, each bevel gear 108, 109 being connected through a magnetic particle clutch 114, 115 and a shaft 110m, 112m respectively to a toothed wheel 116, 117, the toothed wheels 116 and 117 being linked together by a toothed belt 118. Suitable magnetic particle clutches 114, 115, and referred to as variable torque couplings, may be obtained from Smiths Industries Limited, Industrial Instruments Division, Waterloo Road, Cricklewood, London, NW2 7UR, England.

Adjacent and drivably connected to one toothed wheel 116 of each clutch system 106, 107 is a second toothed wheel 120a, 120c linked by a toothed belt 122a, 122c to a toothed wheel 124a, 124c on an output drive shaft 126, 127. The output drive shafts 126, 127 are drivably connected to the drive shafts 16a, 16b, 16c through pairs of bevel gears 130 and 131, 132 and 133, 134 and 135, and through the demountable couplings 90a, 90b, 90c.

When the motor 100 is energised, the shaft 102 rotates, and in each clutch system 106, 107 the two shafts 110, 112 rotate in opposite directions. Each magnetic particle clutch 114, 115 is operated electrically, and when energised transmits the drive from the shaft 110 or 112 on one side of the clutch 114, 115 to the shaft 110m or 112m on the other side. The direction of rotation of the toothed wheel 116 in each clutch system 106, 107 and hence of the drive shafts 16a, 16b, 16c, is thus determined by which of the magnetic particle clutches 114, 115 is energised in the corresponding clutch system 106, 107. If the clutch 114, 115 is not energised, the shaft 110m, 112m on the non-driven side of the clutch 114, 115 is free to rotate.

Rotation of each threaded shaft 95 causes vertical motion of the hollow columns 96 and hence of the support bar 48 and control member 40, and rotation of the hollow shaft 83 causes rotation of the lead screw 47 by the bevel gears 93, and hence horizontal motion of the control member 40.

Figure 3:
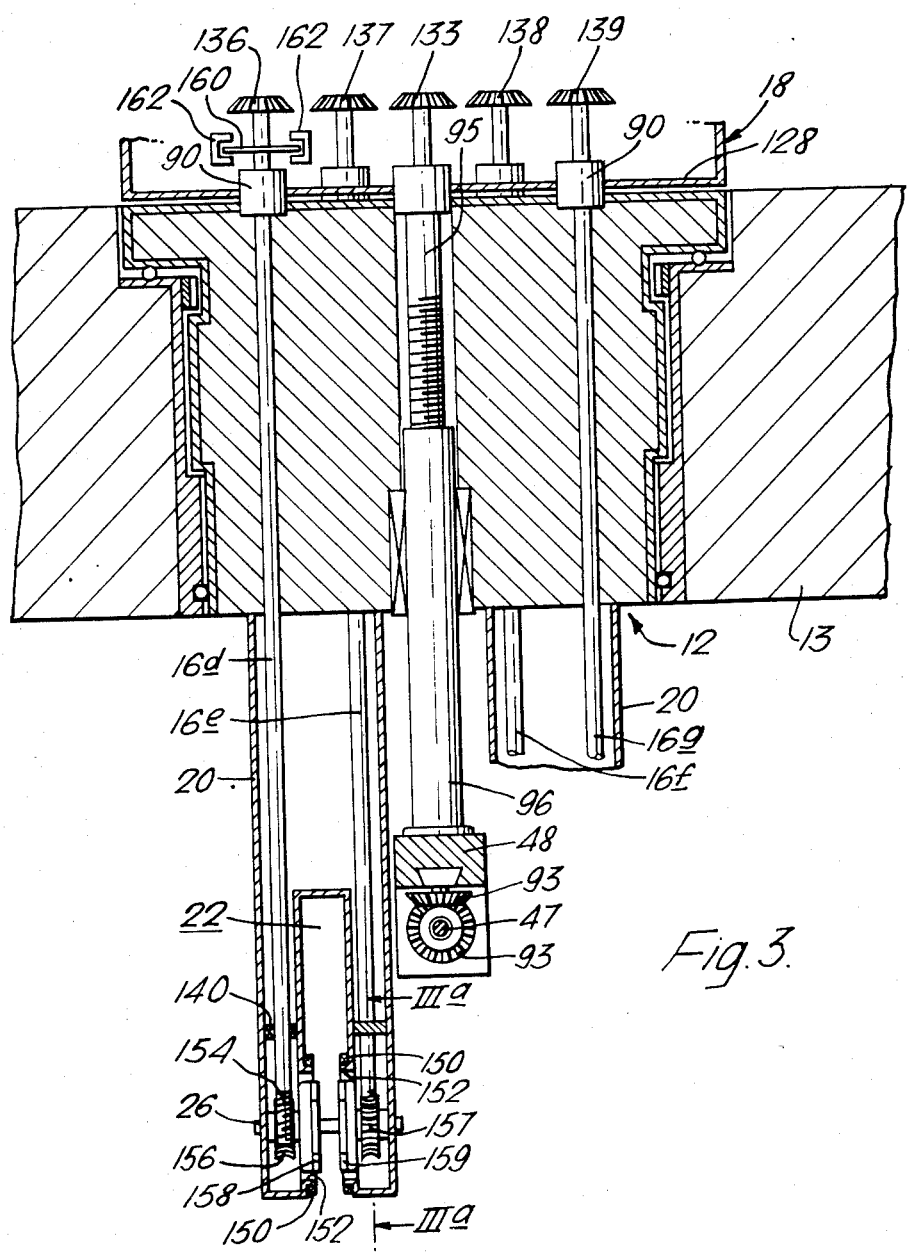
FIG. 3 shows a sectional view on the line III—III of FIG. 2.

Referring now to FIG. 3 and FIG. 3a, the slave arm 10 (omitted for clarity) is suspended from each support beam 20 by bearings 150 around opposing hollow bosses 152 on the inside of the slots 22 and the drives through the plug 12 to other motions of the slave arm 10 are by means of identical rotary drive shafts 16d, 16e, 16f, 16g, each of which is driven at its upper end in exactly the same manner as described above in relation to shaft 16c, through a bevel gear 136, 137, 138, 139 (the mating bevel gears being omitted for clarity) and a demountable coupling 90 incorporating a rotary seal (not shown), and is rotatably mounted in a bearing 140 near its lower end. Each shaft 16d, 16e, 16f, 16g terminates in a worm 154, 155 respectively engaging with a worm wheel 156, 157 supported by the shoulder pivot pin 26, one worm wheel 156, or 157 being mounted on either side of the slot 22 of each support beam 20. Each worm wheel 156, 157 is drivably and coaxially mounted on a hypoid gear wheel 158, 159 engaging with a hypoid gear 222, 220 (see FIG. 6) within the slave arm 10 (not shown).

Mounted onto each drive shaft 16a ... 16g above the demountable couplings 90, is an incremental shaft encoder 160 (only that of shaft 16d is shown) having a pair of detectors 162 placed in phase quadrature relationship by means of which the direction and rate of rotation of the respective drive shaft 16a ... 16g may be determined.

Referring to FIGS. 4, 5 and 6, the angular orientation of the upper arm 30 and the forearm 52 being changed in FIG. 6, each telescopic member 32a, 32b comprises an upper telescopic portion 200 and a lower telescopic portion 202 slidable therein, the lower telescopic portions 202 of the two telescopic members 32a, 32b being linked by the lower bridging member 38, and the upper telescopic portions 200 being linked by a hollow upper bridging member 206.

Referring in particular to FIG. 6, each telescopic member 32a, 32b, contains two rotary drive shaft assemblies 208, 211, each comprising a splined shaft 209, 212 and a corresponding internally splined hollow shaft 210, 213, each hollow shaft 210, 213 being rotatably mounted in bearings 215, 216 in the upper telescopic portion 200, and each splined shaft 209, 212 being rotatably mounted in bearings 218, 219 in the lower telescopic portion 202. The upper end of each drive shaft assembly 208, 211 defines a hypoid gear 220, 222, one hypoid gear 220 engaging with the hypoid gear wheel 159 at the adjacent side of the support beam 20, and the other hypoid gear 222 engaging with the corresponding hypoid gear wheel 158 (not shown) on the other side of the upper arm 30. Similarly, near the lower end of each drive shaft assembly 208, 211 there is a hypoid gear 224, 226, one hypoid gear 226 engaging with a hypoid gear wheel 234 (see FIG. 7) mounted on a hollow axle 225a rotatable about the elbow pivot pin 50, the other hypoid gear 224 engaging with a hypoid gear wheel 230a rotatable about the hollow axle 225a.

As shown in FIG. 5a, pivotally attached to the control pivot pin 42 is a yoke 260 to which are attached two parallel rods 262, which pass in between the two support beams 20 and, as shown in FIGS. 4 and 5, extend through holes 263 through the upper bridging member 206. That portion of each rod 262 remote from the yoke 260 is shaped to define a gear rack 264, along its upper surface, each rack 264 engaging with a respective gear pinion 266 mounted on an axle 268 within the upper bridging member 206. The axle 268 is rotatably supported at each end by bearings 270 fixed to the sides of the upper bridging member 206, and at its mid point has a larger gear pinion 272 engaging with a rack 274 which extends through clearance holes 276 through the upper bridging member 206 and at one end is secured to the lower bridging member 38.

The ratio:

$$\frac{\text{the pitch diameter of the larger pinion 272}}{\text{the pitch diameter of each pinion 266}}$$

is equal to the ratio:

$$\frac{\text{distance between axis } Y\text{-}Y \text{ and axis } X\text{-}X}{\text{distance between axis } Y\text{-}Y \text{ and axis } Z\text{-}Z}$$

Thus, in operation, in whatever direction the control member 40 and hence the control pivot pin 42 is moved relative to the shoulder pivot pin 26, the elbow pivot pin 50 undergoes the same motion relative to the shoulder pivot pin 26, the distances moved by the elbow pivot pin 50 and the control pivot pin 42 being in the above ratio. Thus if the control pivot pin 42 moves towards (or away from) the shoulder pivot pin 26, then the blocks 36 will slide along the slides 34, and the racks 264 will move rotating the pinions 266 and hence the larger pinion 272, so moving the rack 274 in the opposite direction. Hence the lower telescopic portions 202 are caused to move relative to the upper telescopic portions 200, causing the elbow pivot pin 50 to move towards (or away from) the shoulder pivot pin 26, the distance moved by the elbow pivot pin 50 being greater by the above ratio than the distance moved by the control pivot pin 42. On the other hand if the control pivot pin 42 moves along an arc of a circle centred on the shoulder pivot pin 26, so too will the elbow pin 50, through the same angle, and the upper arm 30 will not vary in length.

Referring to FIG. 7, from which drive means inside the forearm 52 for motions of the jaw mechanism 60 and the jaws 62 have been omitted, cylindrical hollow members 280 extend from the sides at the ends of the lower telescopic portions 202 and support bearings 282 about which a housing 283 for the forearm 52 locates, thereby enabling the forearm 52 to turn about the axis X—X. The elbow pivot pin 50 is secured at each end to circular end caps 284 closing circular apertures 286 in the sides of the lower telescopic portions 202. Near the ends of the drive shaft assemblies 211 are the hypoid gears 226 engaging with the hypoid gear wheels 234 which are mounted on the hollow axles 225a, 225b rotatable about the elbow pivot pin 50 and near the ends of the drive shaft assemblies 208 are the hypoid gears 224 engaging with the hypoid gear wheels 230a, 230b which are rotatable about the hollow axles 225a, 225b. The hypoid gear wheel 230a extends from one end of a hollow shaft portion 240, rotatable about the hollow axle 225a, and having a bevel gear 243 at its other end. A hollow shaft 241 extending at one end from the hypoid gear wheel 230b, has a bevel gear 245 at its other end. The forearm 52 locates in a spigot portion 285 of the housing 283 and is rotatable in spaced-apart bearings 287, a bevel gear 289 at the upper end of the forearm 52 engaging the bevel gears 243, 245. Thus the drive to cause the slave arm 10 to bend, i.e. to cause the forearm 52 to turn about the axis X—X, or to rotate in the bearings 287 (referring to FIGS. 3, 3a, 6 and 7) takes place from the drive assembly 18, through the bevel gears 137, 138, the rotary drive shafts 16e, 16f, the worms 155, the worm wheels 157 and the hypoid gear wheels 159, causing rotation of the hypoid gears 220, the rotary drive shaft assemblies 208 and the hypoid gears 224 and so turning the hypoid gear wheels 230a, 230b, the hollow shaft portions 240, 241 and thus the bevel gears 243, 245. If the bevel gears 243, 245 are driven in the same direction, the forearm 52 is turned about the axis X—X, but if driven at the same speed in opposite directions, the forearm 52 rotates in the bearings 287.

Referring also to FIG. 1, if the forearm 52 is at a desired orientation, and the upper arm 30 pivots in pitch motion P about the shoulder axis Y—Y, then the frictional resistance between the worms 155 and the worm wheels 157 inhibits the worm wheels 157 and therefore the hypoid gear wheels 159 from turning. Hence, pitch motion P of the upper arm 30 produces rotation of the hypoid gears 220 and of the rotary drive shaft assemblies 208 about their longitudinal axes, which turns the hypoid gears 224, the hypoid gear wheels 230a, 230b the hollow shaft portions 240, 241 and the bevel gears 243, 245 and so turns the forearm 52 about the axis X—X. The hypoid gear wheels 159 and 230a, 230b and the hypoid gears 220 and 224 are shaped so that, through whatever angle the upper arm 30 pivots about the axis Y—Y, the forearm 52 turns through the same angle but in the opposite sense about the axis X—X, so maintaining the forearm 52 in its desired orientation. Drives to the motions of the jaw mechanism 60 can be derived from the rotation of the hollow axles 225a and 225b which are driven in a similar manner to that of the hollow shaft portions 240, 241. An additional actuating drive (not shown) for the jaws 62 may be driven hydraulically or pneumatically, or may be derived from rotation of the elbow pivot pin 50 for example by a flexible drive shaft.

It will be understood that, in place of the hypoid gears mentioned, other suitable right angle gear drives such as bevels may be used. For example as shown in FIG. 8, to which reference is now made, an alternative manipulator slave arm 300, similar to that of FIG. 1, is shown secured to the sealed cylindrical plug 12 in the roof 13 of the radioactive cell 14 and connected to the demountable drive unit 18 of FIG. 1. Sealed drives 16a–g (see FIGS. 2 and 3) to the slave arm 300 extend through the plug 12 from the demountable drive assembly 18. Two support beams 302 extend down from the base of the plug 12, and have a hole 304 at the lower end of each beam 302 along an axis Y—Y to locate a shoulder pivot pin 306. The slave arm 300 has an upper arm 310 comprising two parallel telescopic members 312a, 312b respectively pivotable in pitch motion P about the axis Y—Y.

As shown in more detail in FIG. 8a to which reference is made, the upper ends of the telescopic members 312a, 312b define slides 314 which support respective sliding blocks 316 between which a control pivot pin 320 extends along an axis Z—Z parallel to the axis Y—Y, the control pivot pin 320 locating in a control member 40 capable of vertical and horizontal displacement and being identical to the control member 40 of FIG. 2. The lower ends of the telescopic members 312a, 312b as shown in FIG. 8 are joined by an elbow pivot pin 50 on an axis X—X parallel to the axis Y—Y, and supporting a forearm 330. At the lower end of the forearm 330 is a wrist pivot pin 54 supporting a jaw mechanism 60 identical to that of FIG. 1. The motions of the component parts of the slave arm 300 are the same as those of the component parts of the slave arm 10 of FIG. 1. In particular, the forearm 330 can pivot V about the axis X—X, and the upper arm 310 can pitch P about the axis Y—Y, and is extensible E. The extension of the telescopic members 312a, 312b is arranged such that the distance from the axis Y—Y to the axis X—X bears a constant ratio to the distance from the axis Y—Y to the axis Z—Z, and such that the axes X—X, Y—Y, and Z—Z remain in a common plane.

Each of the telescopic members 312a, 312b comprises an upper tubular portion 332, and a lower tubular portion 334 slidable in the upper tubular portion 332. Each upper tubular portion 332 extends from a respective rectangular casing 336 from which the respective slide 314 extends. As shown more clearly in FIG. 8b, the casings 336 are linked by a central portion 338 of the shoulder pivot pin 306, and are rotatably supported both by the shoulder pivot pin 306 whose ends are located in bearings 340 in the holes 304 at the lower end of each beam 302, and by bearings 342 between hollow bosses 344 and 346 of the casings 336 and the beams 302 respectively (only those supporting the telescopic member 312a being shown). At an intermediate position along their length the upper tubular portions 332 are linked by a hollow aluminium bridging member 350.

Figure 8B:
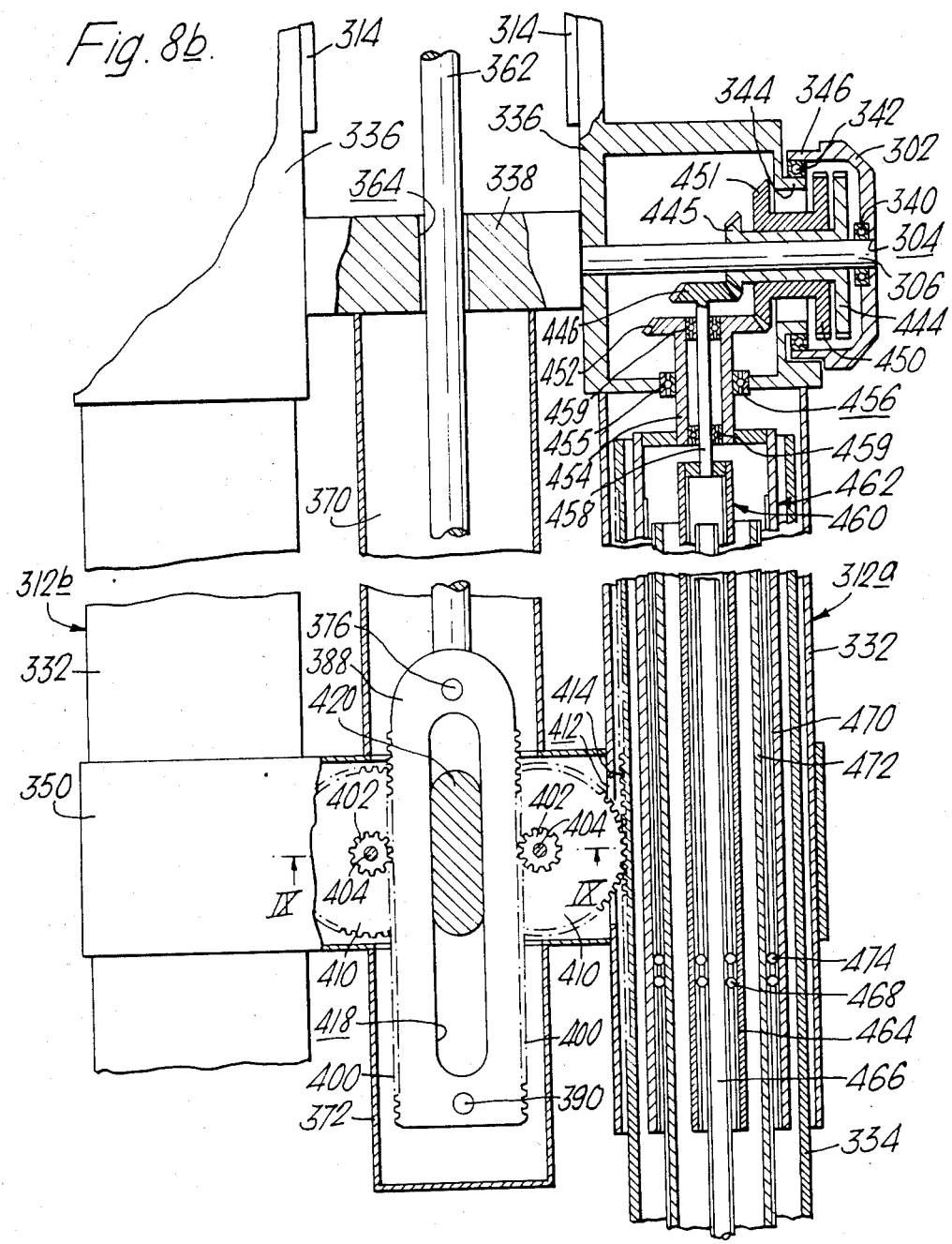
FIG. 8b shows part of a view, partly broken away and to an enlarged scale, in the direction of arrow B of FIG. 8.
Figure 9:
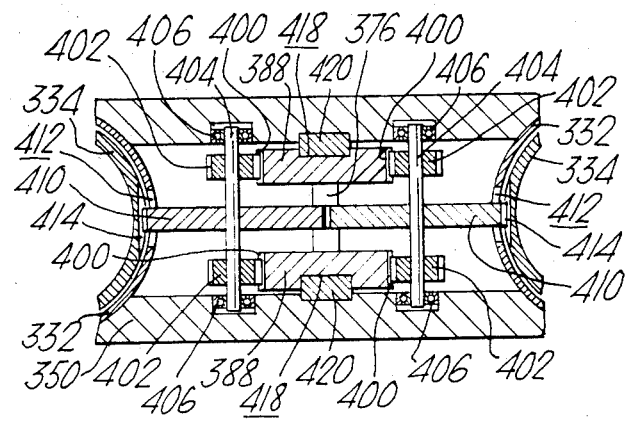
FIG. 9 shows a sectional view on the line IX—IX of FIG. 8b.

As shown in FIG. 8a, pivotally attached to the control pivot pin 320 is a yoke 360, to which is attached a rod 362 which passes (as shown in FIG. 8b) through a hole 364 through the central portion 338 of the shoulder pivot pin 306 into a rectangular housing 370. The housing 370 extends between the central portion 338 of the shoulder pivot pin 306 and the bridging member 350, and a second rectangular housing 372 extends beyond the bridging member 350. To the end of the rod 362 inside the housing 370 are attached, by means of a shoulder pin 376 through the rod 362, two generally rectangular, steel, double-sided rack members 388, spaced apart, one above the other by the pin 376 as shown in FIG. 9, to which reference is now made. The rack members 388 extend through the bridging member 350 into the housing 372, and are joined by a shoulder pin 390 at their ends remote from the rod 362. Along both sides of each rack member 388 is defined a set of rack teeth 400, each set of rack teeth 400 engaging with a respective small pinion 402. The pinions 402 are mounted on two parallel shafts 404 rotatably supported at their ends by bearings 406 in the bridge member 350, and a gear wheel 410 is mounted on each shaft 404 between the two pinions 402. The two gear wheels 410 mesh together, and each extends through a respective slot 412 in the adjacent upper tubular portion 332 to engage with a rack 414 defined on the outside of the adjacent lower tubular portion 334. Along one face of each rack member 388 is a groove 418 in which a phosphor-bronze guide block 420 attached to the bridging member 350 is slidably located.

The ratio:

$$\frac{\text{the pitch diameter of each gear wheel 410}}{\text{the pitch diameter of each pinion 402}}$$

is equal to the ratio:

$$\frac{\text{distance between axis } Y\text{-}Y \text{ and axis } X\text{-}X}{\text{distance between axis } Y\text{-}Y \text{ and axis } Z\text{-}Z}$$

Hence in operation of the slave arm 300, in whatever direction the control member 40 and hence the control pivot pin 320 is moved relative to the shoulder pivot pin 306, the elbow pivot pin 50 undergoes the same motion relative to the shoulder pivot pin 306, the distances moved by the elbow pivot pin 50 and the control pivot pin 320 being in the above ratio. Thus if the control pivot pin 320 moves towards (or away from) the shoulder pivot pin 306, then the blocks 316 will slide along the slides 314, and the rod 362 and rack members 388 will move and rotate the pinions 402, the guide blocks 420 sliding along the grooves 418, so rotating the gear wheels 410 and causing the lower tubular portions 334 to move in the opposite direction. Consequently the elbow pivot pin 50 moves towards (or away from) the shoulder pivot pin 306, and the upper arm 310 shortens (or lengthens) E. On the other hand, if the control pivot pin 320 moves along a circular arc centred on the shoulder pivot pin 306, so too will the elbow pivot pin 50, and through the same angle. The upper arm 310 will not vary in length, but will undergo pitch motion P, turning about the bearings 340 and 342.

The other motions of the slave arm 300 are derived from the drive shafts 16d, 16e, 16f and 16g. Referring again to FIG. 8a, the lower end of each of the drive shafts 16d, 16e defines a worm 154, 155 which engages a respective worm wheel 430, 432 on a respective shaft 434 rotatably supported by bearings 436 (only one is shown) at the lower end of the support beam 302, the two shafts 434 being parallel to the axis Y—Y. Also mounted on each shaft 434 is a gear wheel 438, 440. The gear wheel 438 engages a gear 442 defined at one end of a bobbin-shaped member 444 rotatably mounted on the shoulder pivot pin 306, and the gear wheel 440 engages a gear 448 defined at one end of a bobbin-shaped member 450 rotably mounted on the member 444.

Referring now to FIG. 8b, the other end of each of the members 444 and 450 defines a spiral bevel gear 445 and 451 respectively, that engages a spiral bevel gear 446 and 452 respectively. The gear 452 is defined at one end of a short tubular shaft 454 rotatably supported by a bearing 455 through a hole 456 in the casing 336, and the bevel gear 446 is defined at one end of a short shaft 458 rotatably supported by two spaced-apart bearings 459 inside the short tubular shaft 454. The other ends of the short shaft 458 and of the short tubular shaft 454 are connected to the ends of respective telescopic rotary drive shafts 460 and 462 extending concentrically along the length of the telescopic member 312a and rotatable with respect thereto. The drive shaft 460 comprises an internally splined tube 464 drivably connected at one end by the short shaft 458 to the bevel gear 446, and an externally splined rod 466 telescopically slidable therein guided by steel balls 468 located between opposing splines. The drive shaft 462 is rotatable about the drive shaft 460 and comprises an internally splined tube 470 drivably connected at one end by the short tubular shaft 454 to the bevel gear 452, and an externally splined tube 472 telescopically slidable therein and guided by steel balls 474 located between opposing splines.

The drives through the telescopic member 312b from the drive shafts 16g and 16f are identical to the drives through the telescopic member 312a from the drive shafts 16d and 16e.

Figure 10:
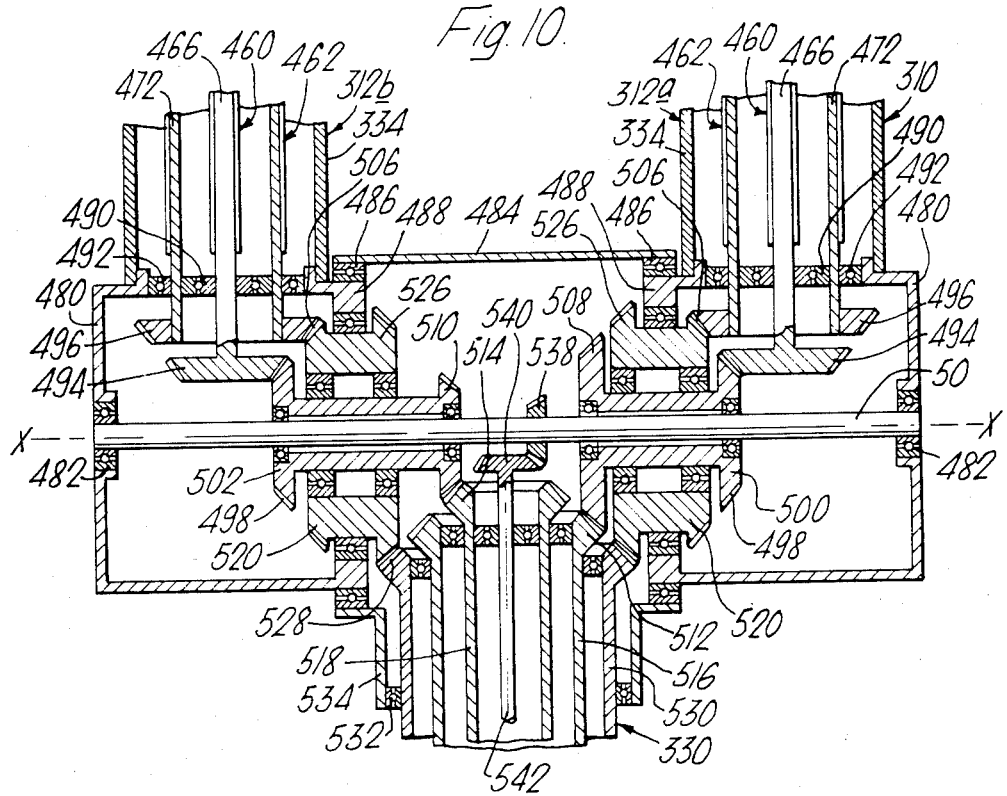
FIG. 10 shows another part of the view in the direction of arrow B of FIG. 8, in medial section.

Referring now to FIG. 10 (in which the forearm 330 is shown colinear with the upper arm 310 for clarity), the lower tubular portions 334 of the telescopic members 312a and 312b are attached to casing portions 480 linked by the elbow pivot pin 50 which is rotatably mounted in bearings 482 at each end, and by a generally cylindrical forearm support casing 484 rotatably supported by bearings 486 on hollow opposed bosses 488 on the casing portions 480. The splined rods 466 are rotatably supported within the splined tubes 472 by bearings 490, and the splined tubes 472 are rotatably supported by bearings 492 in the casing portions 480. The splined rods 466 and the splined tubes 472 terminate in spiral bevel gears 494, 496 within the casing portions 480.

Each bevel gear 494 engages a bevel gear 498 defined at one end of a bobbin-shaped member 500 or 502 rotatably mounted on the elbow pivot pin 50. The other end of each member 500 or 502 defines a respective spiral bevel gear 508 or 510 which engages a bevel gear 512 or 514 at one end of a respective tubular drive shaft 516 or 518 extending concentrically along the length of the forearm 330, and rotatable about the axis thereof.

Each bevel gear 496 engages a bevel gear 506 defined at one end of a bobbin-shaped member 520 rotatably mounted about the member 500 or 502, the other end of each member 520 defining a spiral bevel gear 526. The bevel gears 526 engage diametrically opposite portions of a single spiral bevel gear 528 defined at one end of a forearm tube 530, rotatable about the drive shaft 516. The forearm tube 530 is rotatably supported by a bearing 532 at the open end of a tubular forearm portion 534 of the forearm support casing 484.

A bevel gear 538 is mounted on the elbow pivot pin 50, and engages a bevel gear 540 at one end of a drive shaft 542 extending axially and rotatably along the forearm 330 inside the tubular drive shaft 518.

Thus in operation of the slave arm 300, rotation of the drive shaft 16e by the drive assembly 18 causes rotation of the worm 155, the worm wheel 432, the gear wheel 440, the member 450, the bevel gear 452 and consequently the telescopic rotary drive shaft 462 in the telescopic member 312a. Similarly, rotation of the drive shaft 16f leads to rotation of the telescopic rotary drive shaft 462 in the telescopic member 312b. Rotation of the shafts 462 causes rotation of the bevel gears 496 and the members 520, and of the bevel gears 526. Rotation of the bevel gears 526 in opposite directions but at the same speed causes the forearm tube 530 to turn about its own axis, rotating in the bearing 532, so producing turning motion T of the jaw mechanism 60 (see FIG. 8). Rotation of the bevel gears 526 in the same direction and at the same speed, however, causes the forearm tube 530 and the forearm support casing 484 to pivot about the axis X—X, rotating in the bearing 486, so producing pivoting motion V of the forearm 330.

If the forearm 330 is at a desired orientation and the upper arm 310 pivots in pitch motion P about the shoulder axis Y—Y, then the frictional resistance between the worms 155 and the worm wheels 432 inhibits both the worm wheels 432 and therefore the members 450 from rotating (only those driven by the drive shaft 16e being shown in FIG. 8a). Hence pitch motion P of the upper arm 310 causes rotation of the bevel gears 452 and telescopic rotary drive shafts 462, leading as described above to rotation of the bevel gears 526 in the same direction and at the same speed, so pivoting the forearm 330 about the axis X—X. The bevel gears 451, 452 and 496, 506 have pitch diameters such that, through whatever angle the upper arm 310 pivots about the axis Y—Y, the forearm 330 pivots through the same angle but in the opposite sense about the axis X—X, so maintaining the forearm 330 in its desired orientation.

Rotation of the drive shaft 16d by the drive assembly 18 causes rotation of the worm 154, the worm wheel 430, the gear wheel 438, the member 444, the bevel gears 445, 446 and consequently the telescopic rotary drive shaft 460 in the telescopic member 312a. Similarly, rotation of the drive shaft 16g leads to rotation of the telescopic rotary drive shaft 460 in the telescopic member 312b. Rotation of the telescopic rotary drive shafts 460 causes rotation of the bevel gears 494 and the members 500 and 502 respectively, and hence rotation of the tubular drive shafts 516 and 518 respectively which are used to actuate the motions W and G of the jaw mechanism 60.

Drives to the jaws 62 are provided by rotation of the axial drive shaft 542, brought about by rotation of the elbow pivot pin 50. This may be produced for example by a flexible drive shaft (not shown), or by an electric motor (not shown).

Alternatively the rotary drive shaft 460 in the telescopic member 312a may be tubular, and a telescopic rotary drive shaft (not shown) may be rotatably supported therein drivably connected to the elbow pivot pin 50 by bevel gears (not shown).

It will be understood that for some applications it may be desirable to have individual electric motors for each drive shaft 16 in place of the single electric motor 100.

Figure 11:
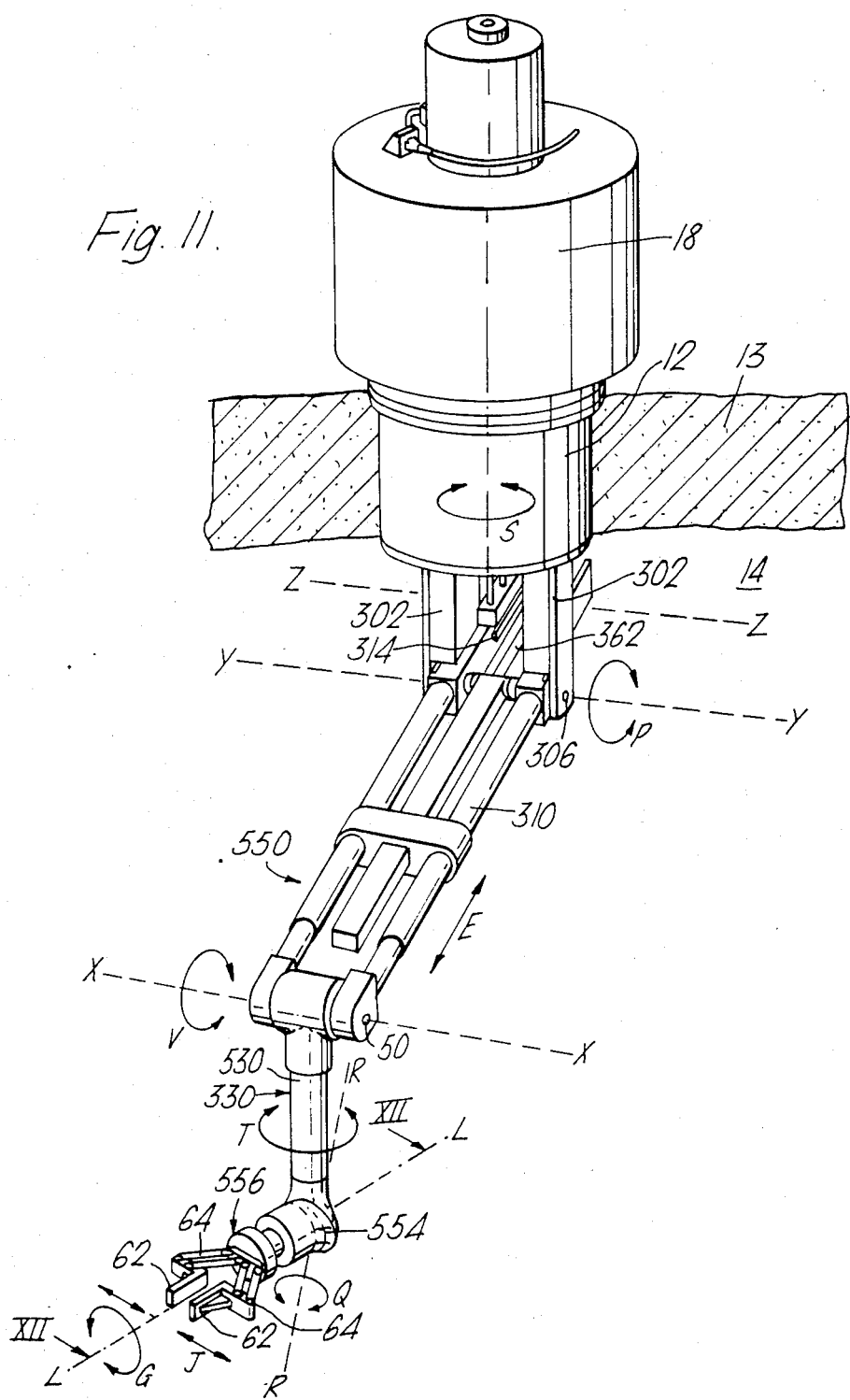
FIG. 11 shows a perspective view of another alternative manipulator slave arm.

It will also be understood that jaw mechanisms capable of motions different from those of the jaw mechanism 60 of FIGS. 1 and 8 may be used in manipulators within the scope of the invention, as shown for example in FIG. 11. In FIG. 11, a manipulator slave arm 550 is shown identical in most respects to the slave arm 300 of FIG. 8, identical parts being referred to by the same reference numerals. The manipulator slave arm 550 differs from that of FIG. 8 only in having a wrist mechanism 554, attached to the end of the forearm 330 remote from the elbow pivot pin 50, which enables a jaw mechanism 556 to rotate Q about an, axis R—R which is at an angle of 45° to the longitudinal axis L—L of the jaw mechanism 556 and also at 45° to the longitudinal axis of the forearm 330, at all times. In addition the jaw mechanism 556 can rotate G about its own longitudinal axis L—L; and it can turn T about the longitudinal axis of the forearm 330, this motion being brought about by rotation of the forearm tube 530 as described above.

Figure 12:
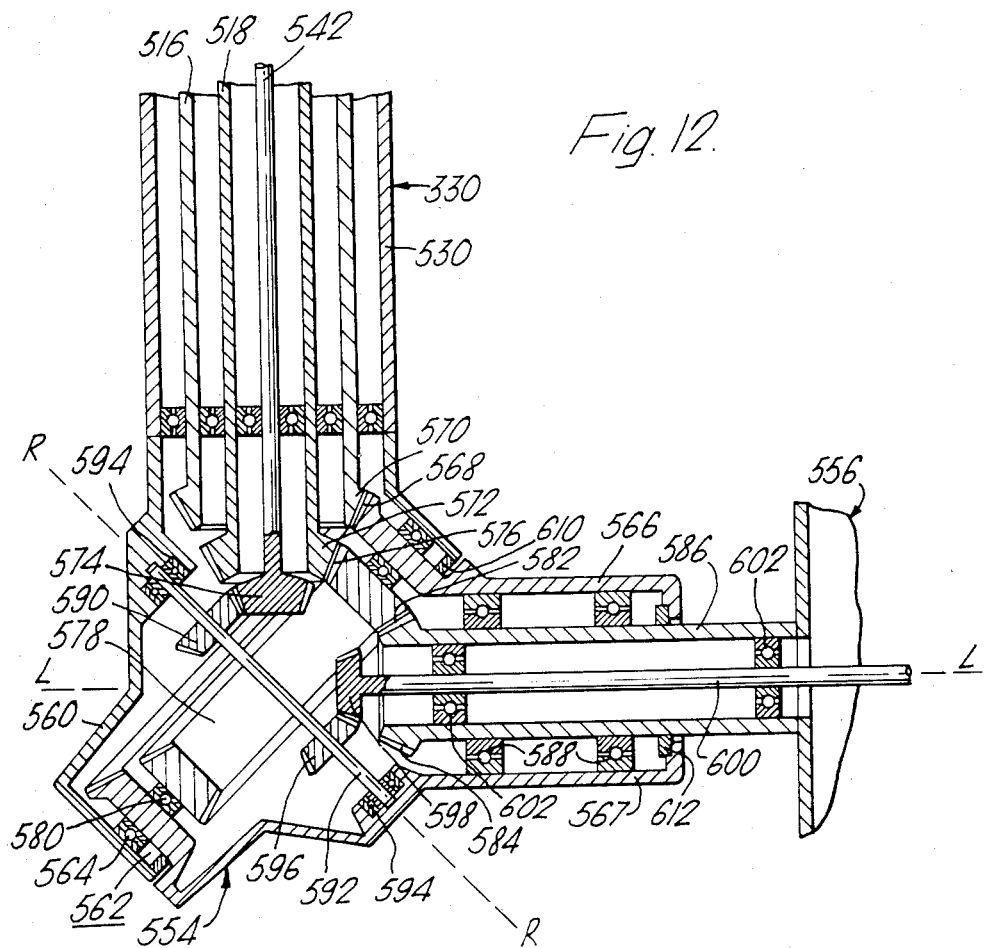
FIG. 12 shows a partial sectional view, to an enlarged scale, in the direction of arrows XII of FIG. 11.

Referring now to FIG. 12, the wrist mechanism 554 comprises a first open-ended casing portion 560, one end of which is attached to the end of the forearm tube 530, and the other end of which defines a cylindrical aperture 562 coaxial with the axis R—R. Rotatably mounted by a bearing 564 in the aperture 562 is a second open-ended casing portion 566 with a tubular extension 567 coaxial with axis L—L. A spiral bevel gear 568 is defined around the open end of the second casing portion 566 within the first casing portion 560 and engages a spiral bevel gear 570 defined at the end of the tubular drive shaft 516. Spiral bevel gears 572 and 574 are also defined at the ends of the tubular drive shaft 518 and the axial drive shaft 542 respectively.

The bevel gear 572 engages a bevel gear 576 defined on one side of a wheel 578 rotatable about the axis R—R and supported by a bearing 580 within the open end of the second casing portion 566. A spiral bevel gear 582 is defined on the other side of the wheel 578, and engages a bevel gear 584 at one end of a tubular drive shaft 586 coaxial with axis L—L rotatably mounted within the tubular extension 567 of the second casing portion 566 by spaced apart bearings 588. The jaw mechanism 556 (a fragmentary portion being shown broken away) is attached to the other end of the tubular drive shaft 586.

The bevel gear 574 engages a spiral bevel gear 590 mounted on a shaft 592 coaxial with axis R—R and rotatably supported at each end by bearings 594 attached to the first and the second casing portions 560 and 566. Another spiral bevel gear 596 is mounted on the shaft 592 and engages a bevel gear 598 at one end of a jaw drive shaft 600 extending along the axis L—L into the jaw mechanism 556 and rotatably supported within the tubular drive shaft 586 by spaced apart bearings 602.

In operation of the slave arm 550, rotation of the tubular drive shaft 516 of the forearm 330 (which is brought about as described above with respect to the slave arm 300 of FIG. 8) causes the second casing portion 566 of the wrist mechanism 554, and hence also the jaw mechanism 556, to rotate Q about the axis R—R. Rotation of the tubular drive shaft 518 causes rotation of the wheel 578 about the axis R—R, and hence rotation of the tubular drive shaft 586 and rotation G of the jaw mechanism 556 about the axis L—L. Rotation of the axial drive shaft 542 causes rotation of the shaft 592 and hence of the jaw drive shaft 600, so as to produce prehensile motion J of the jaws 62 of the jaw mechanism 556 (see FIG. 11).

The manipulator slave arm 550 of FIG. 11 has an advantage over the slave arm 300 of FIG. 8 in that the joint between the forearm 330 and the jaw mechanism 556 can readily be sealed against ingress of dust or other contaminants. As shown in FIG. 12, a rotary seal 610 is provided in the aperture 562, between the first casing portion 560 and the second casing portion 566, and a rotary seal 612 is provided between the tubular extension 567 of the second casing portion 566 and the tubular drive shaft 586. By inhibiting ingress of dust into the wrist mechanism 554 and the forearm 330, wear of the drives therein is minimised.

Although the manipulator slave arms 10, 300, 550 of FIGS. 1, 8 and 11 have been described as being secured to sealed plugs 12 in a roof 13 of a radioactive cell 14, it will be understood that the plugs 12 may be installed in a wall or a floor of a radioactive cell 14, or some other containment. Alternatively, it will also be understood that a manipulator within the scope of the invention may be free-standing, or mounted on a mobile support for robotic use in non-radioactive applications, for example in a plant assembly line.

The foregoing manipulators may be controlled by the operator using a master unit to provide electrical signals to the magnetic particle clutches 104, 105. Such a master unit might be similar to that described in British Patent Specification No. 2 058 009 A (U.S. patent application Ser. No. 184,304, now U.S. Pat. No. 4,367,998).

We claim:

1. A manipulator including a slave arm comprising, a support means defining a first pivotal connection; an upper arm portion of the slave arm arranged to be supported by the first pivotal connection at an intermediate position along the length of the upper arm portion, and defining a second pivotal connection at one end of the upper arm portion and defining a movable connection at or near the other end of the upper arm portion, the axes of the first and of the second pivotal connection being substantially parallel; a forearm portion of the slave arm connected at one end to the second pivotal connection; pivoting means connected to the movable connection for pivoting the upper arm portion about the first pivotal connection, and drive means for moving the pivoting means; the distances of the second pivotal connection and of the movable connection from the first pivotal connection being variable but such that the ratio of the distances between the first and the second pivotal connections and between the first pivotal connection and the movable connection, is maintained substantially constant, and the slave arm being arranged so that pivotal movement of the upper arm portion about the first pivotal connection produces pivotal movement of the forearm portion about the second pivotal connection through the same angle as the pivotal movement of the upper arm portion but in the reverse direction.

2. A manipulator as claimed in claim 1, wherein the movable connection and the second pivotal connection are slidable along the upper arm portion.

3. A manipulator as claimed in claim 2, wherein the movable connection lies substantially in the plane defined by the axes of the first and the second pivotal connections.

4. A manipulator as claimed in claim 3, wherein the movable connection is pivotally connected to the pivoting means, having a pivotal axis substantially parallel to the axes of the first and the second pivotal connections.

5. A manipulator as claimed in claim 4, wherein the pivoting means is movable in two mutually perpendicular directions in a plane perpendicular to the axes of the first and the second pivotal connections.

6. A manipulator as claimed in claim 1, wherein an elongate member extends from the movable connection along the upper arm portion and defines a rack along a portion of the length of the elongate member, a rack member is connected to the second pivotal connection and extends along the upper arm portion, and compound gear means engage the rack and the rack member so that movement of the elongate member produces movement of the rack member and thereby of the second pivotal connection in the reverse direction and such as to maintain said ratio of distances.

7. A manipulator as claimed in claim 6, wherein the upper arm portion is of telescopic construction and the rack member comprises a telescopic member of the upper arm portion defining a rack along a portion thereof.

8. A manipulator as claimed in claim 1, wherein the upper arm portion incorporates a plurality of drives to movements of the forearm portion.

9. A manipulator as claimed in claim 8, wherein the upper arm portion comprises two members extending parallel to one another from the first pivotal connection to the second pivotal connection, each said member being of telescopic construction and incorporating some of the drives to movements of the forearm portion.

10. A manipulator as claimed in claim 8 wherein each drive comprises a telescopic rotary drive shaft drivable by gears at the ends thereof, and comprising two shafts with opposing splines telescopically slidable with respect to each other.

11. A manipulator as claimed in claim 10, wherein the drives comprise telescopic rotary drive shafts arranged concentrically around each other.

12. A manipulator as claimed in claim 8, wherein the drive means comprises a drive assembly, and a plurality of drives to movements of the pivoting means and of the forearm portion, a single motor and gear trains arranged to be driven by the motor and connected to the drives, the gear trains including pairs of magnetic particle clutches in parallel to engage or disengage a movement in a selected direction.

13. A manipulator as claimed in claim 12, wherein the drive assembly is located outside a hostile environment in which the slave arm is to be used, and sealed drive members extend through an enclosure about the hostile environment from the drive assembly.

14. A manipulator as claimed in claim 8, wherein the forearm portion includes a jaw mechanism rotatable about the longitudinal axis of the forearm portion, and about the longitudinal axis of the jaw mechanism.

15. A manipulator as claimed in claim 14, wherein the jaw mechanism is also rotatable about an axis set at an angle to the longitudinal axis of the forearm portion and at an angle to the longitudinal axis of the jaw mechanism.

16. A manipulator as claimed in claim 15 wherein both the angles are the same at about 45°.

17. A manipulator as claimed in claim 1 in combination with a sealed enclosure through a wall of which the manipulator extends.

* * * * *